INVENTOR
CLAUDE B. NOLTE

BY
Fulwider, Patton, Rieber,
Lee & Utecht
ATTORNEYS

United States Patent Office 3,322,339
Patented May 30, 1967

3,322,339
FLOW METER INTEGRATOR
Claude B. Nolte, Placentia, Calif., assignor to Kingmann-White, Inc., Placentia, Calif., a corporation of Texas
Filed July 19, 1965, Ser. No. 472,847
15 Claims. (Cl. 235—61)

This invention relates generally to apparatus for integration of variable quantities with respect to time, and more particularly, relates to a metering device for continuous measurement of the total quantity of flow of fluid passed a given point in a channel, conduit, or the like fluid conductor.

The apparatus of this invention finds its most important use in connection with measurement of the total quantity of flow of fluids over a predetermined period of time such as, for example, the flow of oil, or gas in transmission lines located in remote areas where conventional electrical power for operation of metering devices is either unavailable or unreliable, or where the presence of conventional electrical power would be hazardous and also where the inaccessibility of such metering devices makes it undesirable, if not impracticable, to visit the metering locations, for collection of conventionally employed types of metering charts, with sufficient frequency to obtain complete and accurate records.

Another important use of this invention resides in its adaptability to the ready conversion of existing conventional chart types of so-called orifice meters into substantially continuous integrator-recorders.

Heretofore, such measurement of fluid flow has been accomplished by indirect methods involving the use of conventional so-called orifice meters or venturi metering devices employing charts, usually circular charts, upon which the differential and static pressure parameters indicative of flow quantity were simultaneously, graphically recorded with respect to time. Periodically, at frequent intervals, the completed charts had to be removed from the flow meters and replaced with new charts, and each completed chart had then to be processed by suitable means to convert the graphical recordings thereon into total flow quantities over chosen periods of time. Such chosen periods of time at most had to be of relatively short duration because of the inherent low capacity of each of the charts.

Several processing methods were employed for obtaining total flow from the chart records. Originally the charts were "sight read" by adding the recorded readings, by visual inspection, at regular time intervals as indicated on the chart. Later planimeters of various kinds were used, which by tracing over the graphical records, produced a reading representative of the area under the graph which is a function of total flow. Still later so-called square root planimeters and integrators were developed incorporating automatic chart scanning features and which more quickly produced a reading directly indicative of total flow in predetermined units. However, all such methods were, at best, laborious, time-consuming and inherently inaccurate.

The most serious inaccuracies in the aforesaid methods arise where the fluid flow rates fluctuate rapidly, as is a common occurrence, resulting in graphical records on the chart which instead of being in the form of discrete, traceable lines, become broad, so-called painted bands. Also, the chart type of record is often incapable of handling the full range of such fluctuations, and due to the slowness of movement of the chart relative to the rapid fluctuations, produce sharp peaked record excursions. The significance of the so-called painted band or the sharp peaked graph, with respect to time, is substantially indeterminate.

Relatively large and costly errors thus occurred in connection with the metering apparatus and the methods heretofore employed, for interpreting the meter records.

It is accordingly a primary object of this invention to provide an improved metering device for continuous integration with respect to time of a variable quantity.

It is another object of this invention to provide a metering device for the continuous direct totalization of the flow of fluids, such as liquids and gases.

It is another object of this invention to provide a fluid flowmeter, capable of unattended metering operations over long periods of time.

It is another object of this invention to provide a fluid flowmeter of improved accuracy over those heretofore known.

It is still another object of this invention to provide a flowmeter which eliminates the false continued totalization of fluid flow at zero flow rate conditions, which usually occurs in the type of metering devices heretofore employed.

It is a still further object of this invention to provide a fluid flow meter which eliminates the need for the relatively short duration, inaccurate and indirect chart types of graphic recordings heretofore usually employed, together with the laborious and inaccurate processing which is subsequently necessary in connection therewith, and to substitute therefor more accurate and substantially continuous direct digital indications of the total metered quantity.

It is a still further object of this invention to provide a fluid flow meter capable of measuring total fluid flow over greater ranges of static and differential pressure parameters than heretofore usually possible.

It is a still further object of this invention to provide a fluid flow meter capable of more accurately measuring fluid flow which includes sharp fluctuations therein.

It is a still further object of this invention to provide a flowmeter which performs a digital totalization which is a square-root function of the controlling input parameters, for use where such parameters are obtained from orifices, venturis, weirs and the like flow responsive devices, whereby such totalization is directly proportional to the total quantity to be measured and is thereby rendered either directly indicative of the total flow or is directly applicable in the characteristic formulas for computing total flow in any desired units, and without the necessity of any subsequent mathematical step of square root extraction.

These and other objects, advantages, and features of novelty will be evident hereinafter.

In the drawings which illustrate a presently preferred embodiment of the invention and in which like reference characters indicate the same or similar parts throughout the several views:

FIGURE 5 is a fragmentary, detailed view taken from line 5—5 of FIGURE 4a.

APPARATUS

Figures 1, 2:
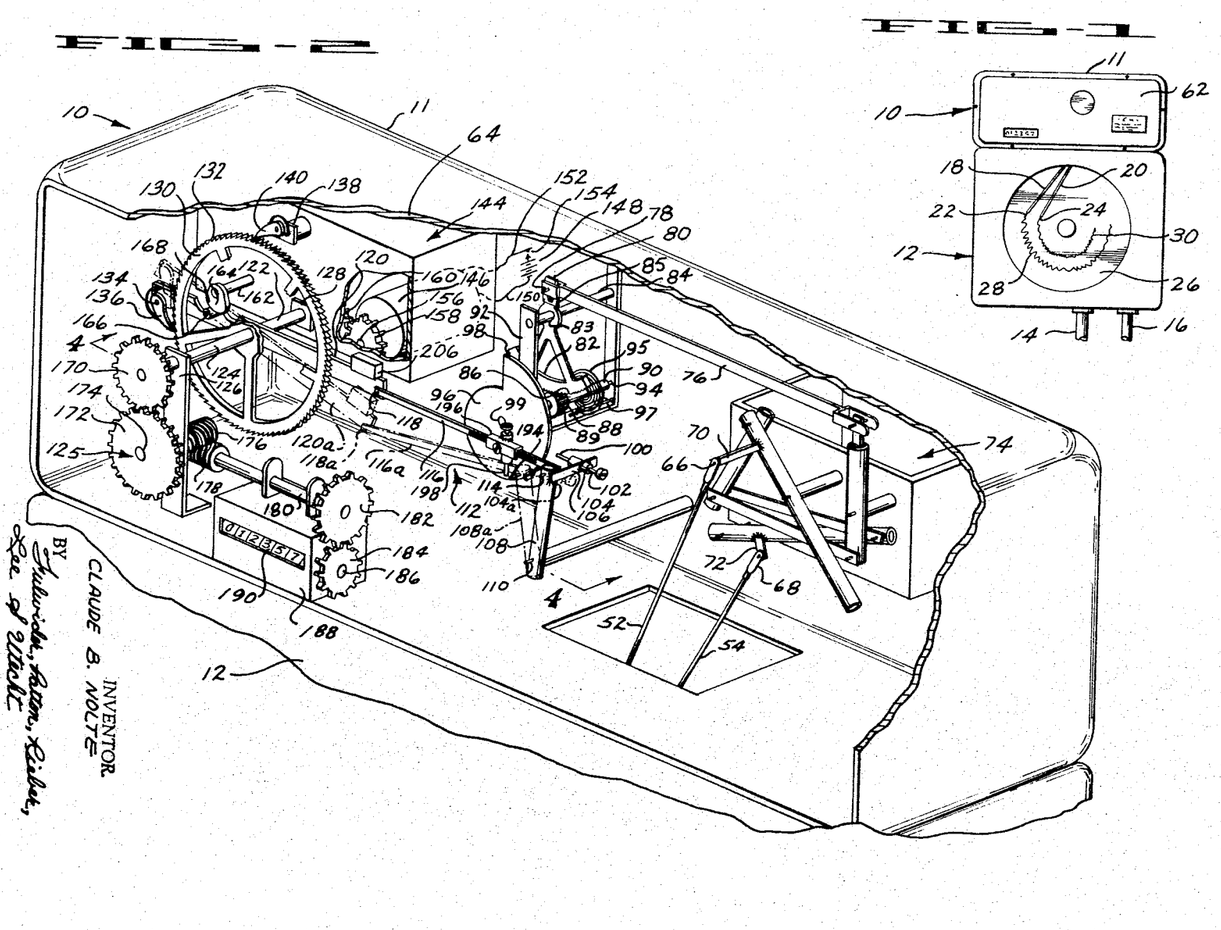
FIGURE 1 is a reduced-sized front elevational view of the general assembly of the encased integrater apparatus of the invention, as used as an added accessory in connection with a conventional orifice flow meter of the type which employs circular charts.
FIGURE 2 is an isometric elevational view, partially schematic, of the general assembly of the apparatus of the invention shown in FIGURE 1, but with portions of the enclosing case thereof broken away to expose the interior mechanism to view, and with the conventional flow meter shown in FIGURE 1 omitted.
Figure 2:
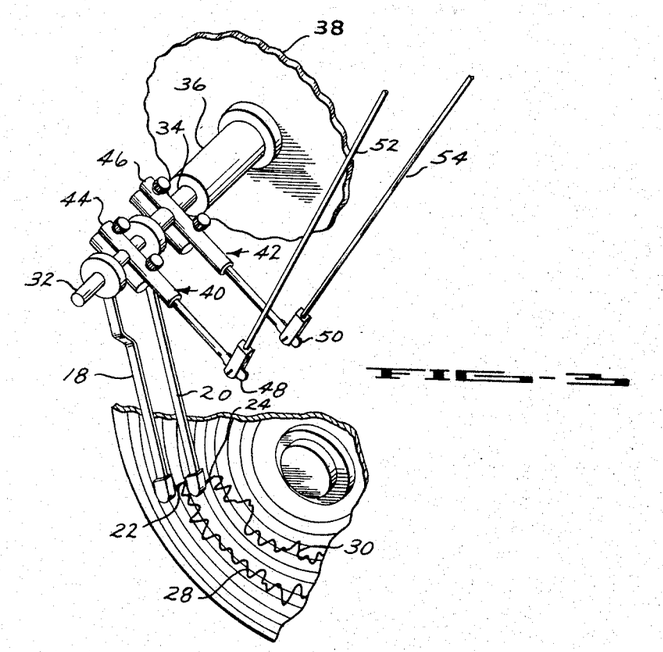

Referring first primarily to FIGURE 1, the integrator apparatus assembly unit shown generally at 10 and enclosed in a weather proof enclosure or case 11, is illustrated by way of example, as a typical, added installation accessory in connection with a typical, conventional circular chart recording type of orifice meter shown generally at 12.

The orifice meter 12 may be of substantially any of the well known types employing one or a pair of pressure responsive transducer means (not shown) depending upon whether the flow to be measured is that of a liquid or a compressible gas. In case of a compressible gas the pressure responsive transducers in the meter may be connected to static and differential pressure connecting lines such as shown at 14 and 16, leading to static and differential pressure connections of a conventional orifice installation in a flow line. The static and differential pressure transducers (not shown) are connected through suitable mechanisms to static pressure and differential pressure recorder pen arms 18 and 20 respectively which are thereby pivoted to move the pens 22 and 24, substantially radially over the graduated marginal surface portions of the circular chart 26 to produce, as the circular chart is rotated about its center at a uniform known rate, a pair of graphical record lines 28 and 30 which are indicative of the aforementioned static and differential pressure parameters with respect to time, applied to the meter.

Figure 3:
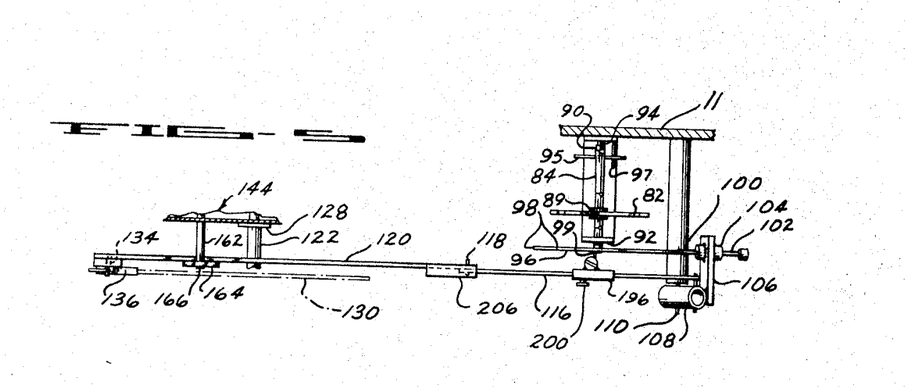
FIGURE 3 is a fragmentary, detailed, isometric view illustrating the mode of connection of the apparatus of the invention with the pen recording mechanism of the conventional metering device illustrated in FIGURE 1.

Referring next primarily to FIGURE 3 in which one of a number of possible, different kinds of orifice meter recording pen arm supporting and driving mechanisms are shown by way of illustration, and not by way of limitation, the pen arms 18 and 20 are fixed to a static drive shaft 32 and a differential drive shaft 34, respectively, which extend coaxially outwardly through a supporting bearing hub 36 which is attached to and extends through a wall member 38 separating the chart compartment portion from the transducer compartment portion of the meter case. The static drive shaft 32 and differential drive shaft 34 extend into the transducer containing compartment back of wall member 38 and are there operatively coupled to their respective static and differential pressure transducers.

Adaptation of the orifice meter 12 for transmission of operational input motions from the pen arms 18 and 20 to the integrating mechanism assembly 10 is accomplished by means of an added pair of drive levers 40 and 42 and elongated drive link members 52 and 54. The drive levers 40 and 42 are provided at their inner ends with shaft clamp means as shown at 44 and 46 by means of which they are fixed to the drive shafts 32 and 34, respectively. The outer ends of the drive levers 40 and 42 are provided with pivot end connectors 48 and 50 to which are drivingly connected the lower ends of static drive link 52 and differential drive link 54, respectively.

Referring next primarily to FIGURE 2 in which the general assembly 10, of the apparatus of the invention is shown in partially schematic form, 11 is the beforementioned enclosure or case in which the apparatus is housed, the front cover shown at 62 in FIGURE 1 having been removed in FIGURE 2, and portions of the edges of case 11 cut away as shown at 64 to expose the integrating mechanism therein to view.

The herein beforementioned static and differential drive links 52 and 54 are pivotally connected at 66 and 68, at their upper ends, with a pair of multiplier input drive tabs 70 and 72 of a mechanical multiplier mechanism shown generally at 74 which, because it does not constitute a portion of this invention is not herein described in detail. In general the multiplier mechanism 74 comprises a system of linkages and levers so interconnected as to produce in an output product drive link 76, an axial movement which is the product of the input axial movements of the static and differential pressure parameter drive links 52 and 54 as applied to the beforementioned multiplier drive input tabs 70 and 72. Thus the axial movement of the output product drive link 76 is proportional to the product of the static pressure parameter and differetnial pressure parameter transmitted through connecting lines 14 and 16, respectively, from the orifice connections in the flow line in which the fluid flow is to be measured.

The beforementioned output product drive link 76 is pivotally connected at its end 78 with the upper end of a movement input lever 80 which extends radially from a gear movement sector 82 which is rotatably supported at its rotational center 83 on a fixed shaft 84. The length of the input lever 80 is adjustable in length by means of a screw clamped adjustable coupling 85. The peripheral portion of the gear sector 82 is provided with gear teeth 86 which make driving engagement with the teeth 89 of a cam drive pinion 88 which is, in turn, fixed on a rotatable cam drive shaft 90. The cam drive shaft 90 is suitably rotatably supported adjacent its ends in a pair of fixed bearings 92 and 94. A spiral hair spring 95, with one end connected to the cam drive shaft 90 and the other end fixed to a stationary attachment pin 97, serves to apply rotational bias to the shaft 94 sufficient to eliminate backlash between the teeth of the gear sector 82 and pinion 88.

Fixed to the outer end of the cam drive shaft 90 is a spiral cam 96. The spiral cam 96 has an outer edge cam surface 98 preferably having the form of an Archimedes spiral, in which the radial distance of the cam surface 98 from the center of rotation 99 of the cam, varies in direct proportion to the rotational angle thereof about such center. In other words, the radial distance of each incremental portion of the outer cam surface is at a radial distance from the center of rotation of the cam which is a linear function of the rotational angular position thereof about such center.

Movably supported adjacent to, and in alignment with, the cam surface 98 is a movable cam feeler 100. The cam feeler 100 includes a feeler set screw 102 which is axially adjustably threaded through a fastening member 104 which is fixed to a bracket 106 extending laterally from the upper end of a pivoted striker arm 108. The striker arm 108 is pivotally supported adjacent its lower end upon a fixed pivot 110. Thus by pivotal angular movement of the striker arm 108 between the positions illustrated in FIGURES 4b and 4c, the end of the feeler member 100 is also moved therewith a distance ($d$) between the positions at which it is separated a distance ($d$) from the cam edge surface 98 and at which it makes motion-limiting contact with the cam edge surface 98. It will be evident, as hereinafter more fully explained, that the distance ($d$) of movement of the feeler member 100 between the separated position shown in FIGURES 4a and 4b at which it is spaced away from contact with the cam edge surface 98, and the contacting position shown in FIGURE 4c, in which it is in motion-limiting contact with the cam edge surface 98, will be substantially a linear function of the angular rotational position of the cam 96 between predetermined limits.

The striker arm 108 is of such length that for the relatively small angles through which it pivots in operation the motion of the cam feeler 100 and pivot 114 is substantially in a straight line.

Referring again primarily to FIGURES 4 and 5 and also to FIGURE 2, a so-called square root extraction linkage is therein shown generally at 112. Included in the square root extraction linkage 112 is the beforementioned pivoted striker arm 108, to the upper end portion of which is pivotally attached as pivot 114, which is positioned at a radial distance from the fixed pivot 110 equal to that of the feeler member 100, one end of a floating link member 116, the opposite end of which is similarly pivotally coupled by means of a floating pivot connection 118 to one end of an integrating drive link or lever 120. The integrating drive lever 120 is pivotally supported adjacent its midsection at 122 upon a ratchet wheel shaft 124, such that the integrating drive lever 120 is freely rockable thereon independently of the rotation of the ratchet wheel shaft 124. The lengths of the floating link member 116 between pivots 114 and 118, and the integrating drive lever 120 between pivot points 118 and 122 are equal. The ratchet wheel shaft 124 is rotatably supported adjacent its opposite ends in a pair of bearing means 126 and 128, and has fixed thereon at an intermediate section, a ratchet wheel 130 having formed on the periphery thereof ratchet teeth 132.

Pivotally attached at 134 on the extended end portion of the integrating drive lever 120, opposite the floating pivot connection 118, is a spring-pressed travelling pawl 136 making ratcheting engagement with the beforementioned ratchet teeth 132 of the ratchet wheel 130. Also supported in a stationary position by stationary support means 138 is a spring-pressed stationary pawl 140 which is maintained in ratcheting engagement with the beforementioned ratchet teeth 132 of the ratchet wheel 130. The spring-pressed travelling pawl 136 serves to impart incremental counter-clockwise rotational movement to the ratchet wheel 130 upon each counter-clockwise portion of rocking movement imparted to the integrating lever 120 as hereinafter described.

Contained within the case 11 is an electro-mechanical totalizer drive mechanism shown generally at 144, the specific construction of which does not constitute a part of this invention and therefore is not herein described in detail. However, such totalizer drive mechanism 144 comprises an electric drive motor 146, preferably a D.C. motor which is adapted to be powered by a suitable battery 148 contained within the case 11 and connected to the motor by way of conductors 150 and 152 and switch 154. The motor 146 is provided with a drive shaft 156 carrying a drive gear 158 which is drivingly coupled to a mechanism 160 (not shown) which is capable of imparting periodic rotation through shaft 162 to an eccentric cam 164. The eccentric cam 164 is positioned adjacent to and in alignment with a cam follower roller 166 which is rotatably attached to and extends laterally from a side portion of the integrating drive lever 120.

Figures 4A, 4B, 4C:
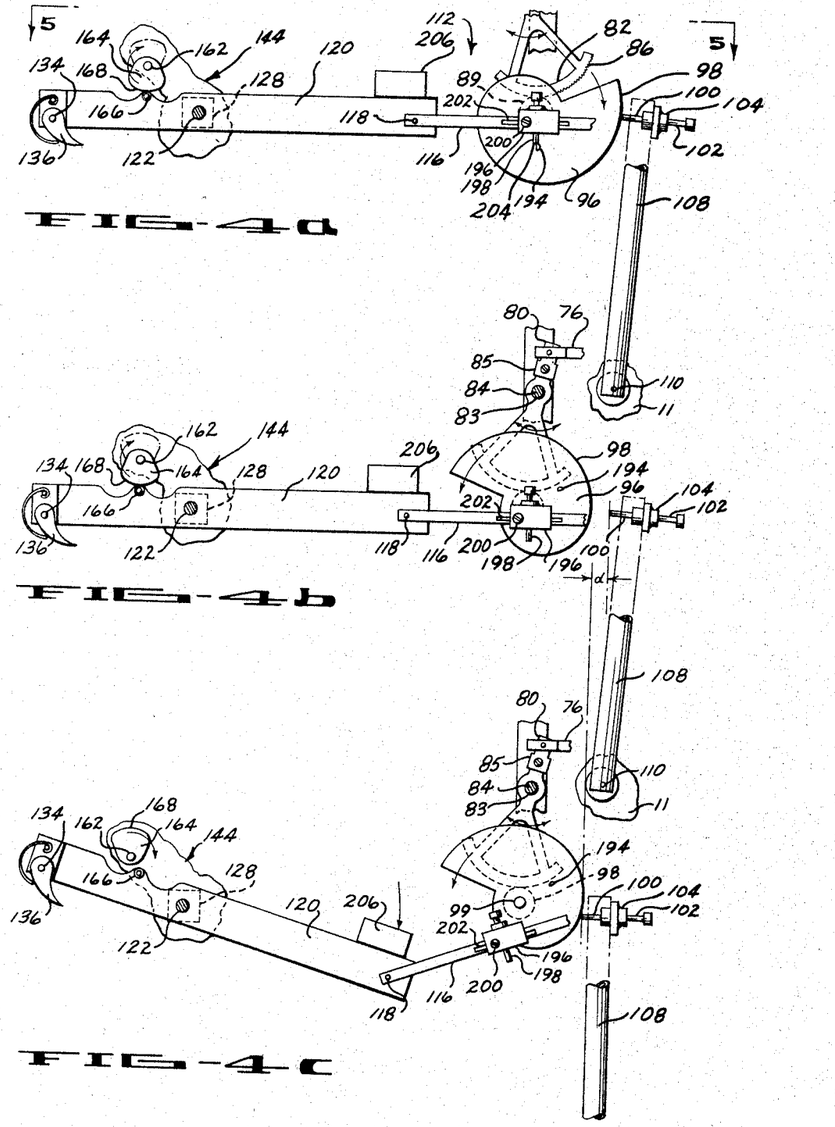
FIGURE 4a is a fragmentary, detailed, side elevational view of the square root computing linkage portion of the apparatus, as viewed approximately from line 4—4 in FIGURE 2, and showing the relative positions of the parts thereof under conditions of an input parameter corresponding to zero flow.
FIGURE 4b is a view of the same apparatus shown in FIGURE 4a, but showing the relative positions of the parts of the square root computing linkage, at one phase of its operation, under conditions of an input parameter thereto corresponding to a typical finite flow condition.
FIGURE 4c is a view of the same apparatus shown in FIGURES 4a and 4b, but showing the relative positions of the parts of the square root computing linkage at another phase of its operation, under the same input conditions shown in FIGURE 4b.

The eccentric cam 164 is shaped with an arcuate lobe 168 of such radial distance from its center of rotation as to contact the follower roller 164 and thereby rock the integrating drive lever 120 counter-clockwise into the aligned position, and to hold it in such position as shown in solid lines in FIGURE 2 and in 4a and 4b at which position the centers of its pivotal support 120 and of the pivots 118 and 114 are in straight line axial alignment. The cam 164 is held stationary in the position shown in FIGURES 2, 4a and 4b for predetermined periodic intervals of time at the end of each of which it is imparted a relatively rapid 360° rotation by the shaft 162 from and return to the position there shown, resulting in permitting the floating link 116 and lever 120 accordingly to drop from the level, aligned position to the angular position as shown in broken lines in FIGURE 2 and as shown in FIGURE 4c and to cause them to return to the aligned position.

Such periodic rotational movements of the cam 160 may be set to occur at any desired predetermined time intervals suitable for the character of the service in which the metering apparatus is to be employed. For example, the totalizer drive mechanism 144 may be set to cause the eccentric cam 164 to rotate at twenty second dwell intervals, with each rotation being completed in approximately two seconds.

The ratchet wheel shaft 124 is drivingly coupled to a metering counter 188 through a transfer gear train shown generally at 125 which comprises a drive gear 170 fixed to the outer end of the ratchet wheel shaft 124 which drivingly meshes with transfer gear 172 coupled through a shaft 174 with a spiral gear 176 which in turn drivingly engages, at right angles thereto, a matching spiral gear 178. The spiral gear 178 is drivingly coupled through a shaft 180 to a gear 182 which drivingly meshes with gear 184 which is carried on a counter shaft 186 which extends into and drives the metering counter 188. The metering counter 188 is provided with a readout scale 190 actuated by the counter shaft 186 which presents figures representative of a predetermined number of revolutions of the ratchet wheel 124 which in turn is a predetermined function of the fluid flow to be measured, in suitable predetermined units.

Referring again primarily to FIGURES 2, 4 and 5, the spiral cam 96 is provided with a semi-cylindrically shaped lock up pin 194 extending from the side thereof. The floating link 116 carries a longitudinally adjustably positioned carrier member 196 to which is threadedly attached a lock up setscrew 198. By loosening and tightening a clamping screw 200 which extends through the carrier member 196 and through a longitudinal slot 202 formed in the floating link 116, the longitudinal position of the lock up setscrew 198 may be adjusted, and also by rotation of the lock up setscrew 198 the distance which its lower end 204 extends laterally below the floating link 116 may also be adjusted. In operation, the position of the lower end 204 of the lock up setscrew 198 is adjusted, and the position of the lock up pin 194 on the spiral cam 96 is made such, that when the product of the static pressure and the differential pressure of the fluid flow is zero, the cam 96 will be in the maximum clockwise rotated position shown in FIGURE 4a, at which position the lock up pin 194 will be in relatively delicate supporting engagement with the lower end 204 of the lock up setscrew 198, thereby locking the cam 96 in the maximum clockwise position and supporting the floating link 116 and the integrating drive lever 120 in the straight line, longitudinal alignment there shown.

OPERATION

Assuming for convenience that the static pressure and differential pressure introduced through the pressure conducting lines 14 and 16 from the orifice or the like flow device, is such as to move the static pressure recorder arm 20 and the differential pressure recorder arm 18 and in turn through the levers 40 and 42 and through the drive links 52 and 54 to move the mechanical multiplier mechanism 74 such that the product of such movements is zero and hence the output produce drive link 76 is thereby longitudinally positioned at a position corresponding to such zero product, then under such conditions the movement gear sector 82 will be in a pivotal position about the shaft 84 such as to rotate the cam drive pinion 88 and the cam drive shaft 90 such as to position the spiral cam 96 in the aforesaid maximum clockwise position shown in FIGURE 4a. At such position, when the cam feeler setscrew 102 and the lock up setscrew 98 are properly positioned, as hereinbefore described, the end of the cam feeler portion 100 of the cam feeler setscrew 102 will be in motion limiting engagement with the cam edge surface 98 of the spiral cam 96 and also, at the same time, the lower end 204 of the lock up setscrew 198 will be in supporting engagement with the upper surface of the lock up pin 194 carried by the spiral cam 196.

Under such conditions as hereinbefore mentioned, the floating link 116 and the integrating drive lever 120 will be restrained to the longitudinally aligned position shown in solid lines in FIGURES 2 and 4a. Under the latter condition in which the floating link 116 and the integrating arm drive lever 120 are in aligned position, the eccentric cam 164, during each of its stationary dwell periods, as illustrated in FIGURES 2 and 4a, will be positioned such that the surface of the arcuate lobe 168 thereof will just contact but not apply any substantial force to the cam follower roller 166. Thus, upon periodic rotation of the cam 164 as herein beforementioned, no motion will be applied to either the integrating drive lever 120 or the floating link 116, and thus the integrating drive lever 120 will not rock but remain stationary so long as the herein beforementioned conditions of zero product of the static pressure and differential pressure prevail. The integrating drive lever 120 thus being stationary, no rotation is imparted thereby, through the pawl 136, to the ratchet wheel 130, and therefore no movement is transmitted through the gear reduction drive train, to the readout scale 190 of the metering counter 188.

However, when the flow conditions of the fluid to be measured are such as to transmit a static pressure and differential pressure through lines 14 and 16 to the orifice meter 12 such as to result in movement of the drive links 52 and 54, such that the product thereof is a finite amount, resulting in longitudinal displacement of the output product drive link 76 a given distance from its zero product position, then the movement gear sector 82 is thereby pivoted about the shaft 84 through an angle such as to rotate the cam drive pinion 88 and cam drive shaft 90 to angularly displace the spiral cam 96 counterclockwise to a different position, such as that illustrated, for example, in FIGURE 4b. At such rotationally displaced position of the spiral cam 96 as shown in FIGURE 4b, the lock up pin 194 is thereby moved out of supporting engagement with the lower end 204 of the lock up setscrew 198 and the cam edge surface 98 of the spiral cam 96 is moved, in effect, away from the end of the cam feeler portion 100 of the cam feeler setscrew 102 a certain distance, as indicated at (d), which is a linear function of the angular displacement of the spiral cam 96 from its zero position shown in FIGURE 4a to its new displacement position shown in FIGURE 4b. The end of the cam feeler portion 100 of the cam feeler setscrew 102 being thus spaced away from contact with the cam edge surface 98 of the spiral cam 96, the integrating linkage 112 consisting of the floating link member 116 and the integrating drive lever 120 is free, upon each periodic rotation thereof from the position shown in FIGURE 4b to that shown in FIGURE 4c and return, to drop due to the weight unbalance imparted to it by counter weight 206, to the disaligned angular position shown in FIGURE 4c, at which latter position the end of the cam feeler member 100 of the cam feeler set screw 102 is moved into momentary movement limiting engagement with the cam edge surface 98 of the spiral cam 96, which engagement serves to determine the angle and distance to which the floating link 116 and integrating drive lever 120 will drop and, hence, determines the magnitude as indicated at (a), of the accompanying rocking movement of the integrating drive lever 120.

Assuming that the static and differential pressures remain unchanged, the position of the spiral cam 196 will correspondingly remain unchanged and during such time the periodic rotation of the eccentric timing cam 164 will result in periodically releasing the integrating drive lever 120 to rock clockwise through the angle (a) and return to the horizontal aligned position. Each time the integrating drive lever thus rocks from the dropped angular position shown in FIGURE 4c to the horizontal aligned position shown in FIGURE 4b, the travelling pawl 136 acts upon the ratchet teeth 132 of the ratchet wheel 136 such as to impart a corresponding angular increment of rotation, in a counter clockwise direction, to the ratchet wheel 130. Each such incremental counter clockwise rotation imparted to the ratchet wheel 130 is transmitted through the transfer gear train 125 to the shaft 186 of the metering counter 188 thus moving the readout scale 190 to a new value representative of the addition of such incremental rotation. The summation or totalization of such incremental rotations of the ratchet wheel 130 over a given period of time is thus represented by the figures appearing in the readout scale 190 which are directly proportional to the fluid flow being measured.

As herein beforementioned, the square root extracting linkage 112 which comprises the spiral cam 96, cam feeler member 100, striker arm 108, floating link member 116, and the integrating drive lever 120, have the geometrical properties of producing incremental angular rocking movements (a) in the integrating drive lever 120 which bear a square root functional relationship to the distance of movement of the end of the cam feeler member 100 permitted by the rotational angular position of the spiral cam 96. Therefore, since the spiral cam 96 is, as herein beforementioned, of such shape that the cam edge surface 98 bears a linear radial distance relationship relative to its rotational position about center of rotation then the incremental angular rocking movements (a) of the integrating drive lever 120 likewise have a square root functional relationship to the rotational position of the spiral cam 96 which, is in turn, proportional to the product of the static and differential input pressures of the orifice meter. Thus, finally, the summation of the incremental rocking movements (a) of the integrating drive lever 120 is at any given instance, as represented by the readout scale 190, directly proportional to the fluid flow desired to be measured.

An important advantage in the mechanical construction and operation of the apparatus of this invention resides in the employment of a spiral cam such as that shown in 96 which is formed with an Archimedes cam edge surface or, in other words, as herein beforedescribed, has a cam edge surface 96 which has a locus bearing a linear radial distance relation to rotational angular positions thereof. With such a linear cam, the varying spacings between the cam edge surface and the end of the cam feeler portion 100 always bears a linearly proportional relationship to the angular rotational position of the cam 96 which, in turn, bears a linear relationship to the product of the static and differential pressures received from the orifice meter. Thus, this basic relationship in such linear cam always remains true regardless of the initial zero position setting of the spiral cam 96 relative to the cam drive shaft 90 and relative to the output product drive link and the other linkages leading thereto as contrasted to that of a square root cam or other exponential cam on which there exists only one reference spot on the cam and only one setting position for the cam at which the desired mathematical relationship will be valid. The necessary square root extraction of such linear spacings is then accomplished by means of the square root extraction linkage 112, as herein before described.

In the absence of the square root extraction linkage 112, it would be necessary to form the spiral cam such that its cam edge surface bears a square root relationship to angular rotational positions of the cam. The construction of such square root shaped spiral cams results in a shape which is not only difficult to form but also results in varying angular cam surfaces which are of sufficient departure to make it impossible to have the cam feeler always meet the cam edge surface sufficiently closely to the normal to prevent feed back of components of the feeler forces through the orifice meter transducer mechanism with resultant errors in the flow measurements.

Another important advantage of the apparatus of this invention is that it eliminates any requirements for an external power source. Another important advantage of the apparatus of this invention is that the accuracy of the flow measurements made by it are not impaired when the flow of the fluid being measured is interrupted for extended periods of time. In contrast to the apparatus of the present invention, in some commerical meters, it is difficult or impossible to adjust the apparatus so that it will cease to continue measurement at zero flow conditions without actually cutting off the flow and the measurement mechanism by some extraneous means. With the integrating apparatus of the present invention, with zero locking mechanism herein before described, it is possible for the operator to adjust the lock up point and resultant cessation of measurement action of the apparatus to occur precisely at the point of zero flow.

It is to be understood that the foregoing is illustrative only and that the invention is not limited thereby, but includes all modifications thereof within the scope of the definition of the appended claims.

What is claimed is:

1. In a metering device for integrating a varying quantity with respect to time, apparatus comprising:
  a cam mounted for rotation about its center of rotation, and having a spiral cam surface varying in position relative to a reference point linearly with respect to rotational angles of said cam about said center of rotation;
  means to position said cam at rotative angles between limits about said center of rotation in accordance with a predetermined function of said varying quantity;
  feeler means including means for periodically imparting movement of said feeler means along a fixed path from a predetermined position into a position of contact with the said cam surface and return to said predetermined position, the distance between said predetermined position and such position of contact for each such movement of said feeler means along said path being determined by the position of said cam surface at the angular position of said cam at the instant of such contact, whereby said distance for each such movement bears a substantially linear relationship with such angular positions of said cam;
  and means responsive to such linear movements of said feeler means for producing an output quantity which is substantially the square root of the total of said distances of such linear movements over a given interval of time.

2. In a metering device for integrating a varying quantity with respect to time, apparatus comprising:
  a cam mounted for rotation about its axis of rotation, and having a spiral cam surface varying in radial distance relative to said axis of rotation linearly with respect to rotational angles of said cam about said center of rotation;
  means to position said cam at rotative angles between limits about said center of rotation in accordance with a predetermined function of said varying quantity;
  feeler means including means for periodically imparting movement of said feeler means along a fixed path substantially normal to said axis of rotation from a predetermined position into a position of contact with the said cam surface and return to said predetermined position, the distance between said predetermined position and such position of contact for each such movement of said feeler means along said path being determined by the position of said cam surface at the angular position of said cam at the instant of such contact, whereby said distance for each such movement bears a substantial linear relationship with such angular positions of said cam;
  and means responsive to such linear movements of said feeler means for producing an output quantity which is substantially the square root of the total of the distance of such linear movements over a given interval of time.

3. In a metering device for integrating a varying quantity with respect to time, apparatus comprising:
  a cam mounted for rotation about its center of rotation, and having a spiral cam surface varying in position relative to a reference point linearly with respect to rotational angles of said cam about said center of rotation;
  means to position said cam at rotative angles between limits about said center of rotation in accordance with a predetermined function of said varying quantity;
  feeler means;
  means for restraining said feeler means to movement along a fixed path relative to said cam;
  means for periodically imparting such movement of said feeler means along said path from a predetermined position into a position of contact with the said cam surface and return to said predetermined position, the distance between said predetermined position and such position of contact for each such movement of said feeler means along said path being determined by the position of said cam surface at the angular position of said cam at the instant of such contact, whereby said distance for each such movement bears a substantially linear relationship with such angular positions of said cam;
  and means responsive to such linear movements of said feeler means for producing an output quantity which is substantially the square root of the total of said distances of such linear movements over a given interval of time.

4. In a metering device for integrating a varying quantity with respect to time, apparatus comprising:
  a cam mounted for rotation about its center of rotation, and having a spiral cam surface varying in position relative to a reference point linearly with respect to rotational angles of said cam about said center of rotation;
  means to position said cam at rotative angles between limits about said center of rotation in accordance with a predetermined function of said varying quantity;
  feeler means;
  means for restraining said feeler means to movement along a fixed path relative to the said center of rotation of said cam and intersecting said cam surface;
  means for periodically imparting such movement of said feeler means along said path from a predetermined reference position into a position of contact with said cam surface and return to said predetermined reference position, the distance between said predetermined position and such position of contact for each such movement of said feeler means being determined by the position of said cam surface at the angular position of said cam at the instant of such contact;
  and computer means responsive to such movements of said feeler means for indicating a quantity which is substantially the square root of the total of the said distances of such movements over a given interval of time, said computer means including:
  a link member having adjacent one end portion thereof, a first pivotal connection to said feeler means;
  a lever member having a fixed pivotal support at one portion thereof and having, adjacent an end thereof, a second pivotal connection with the other end portion of said link member;
  the said second pivotal connection being in substantial alignment with said first pivotal connection and said pivotal support when said feeler means is in said reference position, and said second pivotal connection being in lateral disalignment with said first pivotal connection and said pivotal support when said feeler means is in said portion of contact with said cam surface, whereby said lever member is periodically pivoted about said pivotal support through an angle determined by said distance of each such movement of the feeler means;

and means for summation of such pivot angles over a predetermined time.

5. Apparatus in accordance with claim 4 and with the said lever member being of the same length between said pivotal support and said second pivotal connection as the length of said link member is between said first pivotal connection and said second pivotal connection.

6. In a metering device for integrating a varying quantity with respect to time, apparatus comprising:

a cam mounted for rotation about its center of rotation, and having a spiral cam surface varying in position relative to a reference point linearly with respect to rotational angles of said cam about said center of rotation;

means to position said cam at rotative angles between limits about said center of rotation in accordance with a predetermined function of said varying quantity;

feeler means;

feeler support means for restraining said feeler means to movement along a fixed path relative to the said center of rotation of said cam and intersecting said cam surface;

said support means including an arm carrying said feeler means adjacent one end portion thereof and pivotally supported adjacent the other end portion thereof;

means for periodically imparting such movement of said feeler means along said path from a predetermined reference position into a position of contact with said cam surface and return to said predetermined reference position, the distance between said predetermined position and such position of contact for each such movement of said feeler means being determined by the position of said cam surface at the angular position of said cam at the instant of such contact;

and computer means responsive to such movements of said feeler means for indicating a quantity which is substantially the square root of the total of the said distances for such movements over a given interval of time, said computer means including:

a link member having, adjacent one end portion thereof, a first pivotal connection to said feeler means;

a lever member having a fixed pivotal support at one portion thereof and having, adjacent an end thereof, a second pivotal connection with the other end portion of said link member;

the said second pivotal connection being in substantial alignment with said first pivotal connection and said pivotal support when said feeler means is in said reference position, and said second pivotal connection being in lateral disalignment with said first pivotal connection and said position of contact with said cam surface, whereby said lever member is periodically pivoted about said pivotal support through an angle determined by said distance of each such movement of the feeler means;

and means for summation of such pivot angles over a predetermined time.

7. In a metering device for integrating a varying quantity with respect to time, apparatus comprising:

a cam mounted for rotation about its center of rotation, and having a spiral cam surface varying in position relative to a reference point linearly with respect to rotational angles of said cam about said center of rotation;

means to position said cam at rotative angles between limits about said center of rotation in accordance with a predetermined function of said varying quantity;

feeler means;

means for restraining said feeler means to movement along a fixed path relative to the said center of rotation of said cam and intersecting said cam surface;

means for periodically imparting such movement of said feeler means along said path from a predetermined reference position into a position of contact with said cam surface and return to said predetermined reference position, the distance between said predetermined position and such position of contact for each such movement of said feeler means being determined by the position of said cam surface at the angular position of said cam at the instant of such contact;

and computer means responsive to such movements of said feeler means for indicating a quantity which is substantially the square root of the total of the said distances of such movements over a given interval of time, said computer means including:

a link member having, adjacent one end portion thereof, a first pivotal connection to said feeler means;

a lever member having a fixed pivotal support at one portion thereof and having, adjacent an end thereof, a second pivotal connection with the other end portion of said link member;

the said second pivotal connection being in substantial alignment with said first pivotal connection and said pivotal support when said feeler means is in said reference position, and said second pivotal connection being in lateral disalignment with said first pivotal connection and said pivotal support when said feeler means is in said position of contact with said cam surface, whereby said lever member is imparted periodic pivotal movement about said pivotal support through an angle determined by said distance of each such movement of the feeler means;

stop means fixed to said link member;

shoulder means fixed to said cam;

said stop means and said shoulder means being positioned to make restraining engagement with one another when said cam is positioned at a rotative angle about its said center of rotation corresponding to a substantially zero value of said varying quantity, such engagement being such as to immovably restrain said link member in position with said first pivotal connection, said second pivotal connection and said pivotal support in substantial alignment with each other, whereby inadvertent periodic pivotal movement of said lever member is prevented during said substantially zero value of said varying quantity.

8. Apparatus according to claim 7 and means for adjusting the relative positions of said stop means and said shoulder means to effect said restraining engagement with one another.

9. In a metering device for integrating a varying quantity with respect to time, apparatus comprising:

a cam mounted for rotation about its center of rotation, and having a spiral cam surface varying in position relative to a reference point linearly with respect to rotational angles of said cam about said center of rotation;

means to position said cam at rotative angles between limits about said center of rotation in accordance with a predetermined function of said varying quantity;

feeler means movable along a fixed path from a predetermined position into a position of contact with the said cam surface and return to said predetermined position, the distance between said predetermined position and such position of contact for such movement of said feeler means being determined by the position of said cam surface at the angular position of said cam at the instant of such contact, whereby said distance bears a substantially linear relationship with such angular position of said cam;

a D.C. powered, electro-mechanical timer means for periodically moving said feeler means between said predetermined position and said position of contact;

and means responsive to such movements of said feeler means for producing an output quantity which is substantially the square root of the total of the said distances of such linear movements over a given interval of time.

10. In a metering device for integrating a varying quantity with respect to time, apparatus comprising:

a cam mounted for rotation about its center of rotation, and having a spiral cam surface varying in position relative to a reference point linearly with respect to rotational angles of said cam about said center of rotation;

means to position said cam at rotative angles between limits about said center of rotation in accordance with a predetermined function of said varying quantity;

feeler means;

means for restraining said feeler means to movement along a fixed path relative to the said center of rotation of said cam and intersecting said cam surface;

self-contained D.C. powered electro-mechanical means for periodically imparting such movement of said feeler means along said path from a predetermined reference position into a position of contact with said cam surface and return to said predetermined reference position, the distance between said predetermined position and such position of contact for each such movement of said feeler means being determined by the position of said cam surface at the angular position of said cam at the instant of such contact;

and computer means responsive to such movements of said feeler means for indicating a quantity which is substantially the square root of the total of the said distances of such movements over a given interval of time, said computer means including:

a link member having, adjacent one end portion thereof, a first pivotal connection to said feeler means;

a lever member having a fixed pivotal support at one portion thereof and having, adjacent an end thereof, a second pivotal connection with the other end portion of said link member;

the said second pivotal connection being in substantial alignment with said first pivotal connection and said pivotal support when said feeler means is in said reference position, and said second pivotal connection being in lateral disalignment with said first pivotal connection and said pivotal support when said feeler means is in said portion of contact with said cam surface, whereby said lever member is periodically pivoted about said pivotal support through an angle determined by said distance of each such movement of the feeler means;

and means for summation of such pivot angles over a predetermined time.

11. Apparatus in accordance with claim 10 in which said electro-mechanical means includes an eccentric cam periodically rotates thereby and which makes operative contact with a portion of said lever member separated longitudinally from said pivotal support, thereby to impart periodic rocking movement of said lever about its said pivotal support.

12. A square root extraction computer, comprising:

a first link member;

a second link member;

floating connection means pivotally interconnecting one end of said first link member directly to one end of said second link member;

fixed pivot means pivotally supporting the other end of said first link member;

support pivot means fixed to the other end of said second link member;

carrier means separated from said fixed pivot means and movably supporting said support pivot means for limited reciprocatory movement thereof along a fixed substantially straight line intersecting both said fixed pivot means and said support pivot means, between a reference position of maximum separation in which said floating pivot connection means lies on said line, and a position of reduced separation in which said floating pivot connection means is displaced laterally from said line, with resultant pivoting of said first link member about said fixed pivot means;

input means to position said support means along said line at a distance from said reference position proportional to a given input quantity;

and output means responsive to said resultant pivoting of said first link member giving an output indication proportional to said resultant pivoting;

said indication thereby bearing substantially a square root functional relation to said input quantity.

13. A square root extraction computer, comprising:

a first link member;

a second link member, said first and second link members being of substantially equal length;

floating pivot connection means pivotally interconnecting one end of said first link member to one end of said second link member;

fixed pivot means pivotally supporting the other end of said first link member;

support pivot means fixed to the other end of said second link member;

carrier means separated from said fixed pivot means and movably supporting said support means for limited reciprocatory movement thereof along a fixed substantially straight line intersecting said fixed pivot means and said support pivot means between a reference position of maximum separation in which said floating pivot connection means lies on said line, and a position of reduced separation in which said floating pivot connection means is displaced laterally from said line, with resultant pivoting of said first link member about said fixed pivot means;

input means to position said support means along said line at a distance from said reference position proportional to a given input quantity;

and output means responsive to said resultant pivoting of said first link member, giving an output indication proportional to said resultant pivoting;

said indication thereby bearing substantially a square root functional relation to said input quantity.

14. In a metering device for integrating a varying quantity with respect to time, apparatus comprising:

a cam mounted for rotation about its center of rotation, and having a spiral cam surface varying in position relative to a reference point in accordance with a predetermined function with respect to rotational angles of said cam about said center of rotation;

means to position said cam at rotative angles between limits about said center of rotation in accordance with a predetermined function of said varying quantity;

feeler means;

means for restraining said feeler means to movement along a fixed path relative to the said center of rotation of said cam and intersecting said cam surface;

means for periodically imparting such movement of said feeler means along said path from a predetermined reference position into a position of contact with said cam surface and return to said predetermined reference position, the distance of each such movement of said feeler means being determined by the position of said cam surface relative to said reference position at the angular position of said cam at the instant of such contact;

and means responsive to such movements of said feeler means including:

a link member having, adjacent one end portion thereof, a pivotal connection to said feeler means;

a lever member having a fixed pivotal support at one portion thereof and having, adjacent an end thereof, a floating pivotal connection with the other end portion of said link member;

the said floating pivotal connection being in substantial alignment with said pivotal connection and said pivotal support when said feeler means is in said reference position, and said floating pivotal connection being in lateral disalignment with said pivotal connection and said pivotal support when said feeler means is in said position of contact with said cam surface, whereby said lever member is imparted periodic pivotal movement about said pivotal support through an angle determined by said distance of each such movement of the feeler means;

shoulder means fixed to said cam;

said shoulder means being positioned to make restraining engagement with said link member when said cam is positioned at a rotative angle about its said center of rotation corresponding to a substantially zero value of said varying quantity, such engagement being such as to immovably restrain said link member in position with said pivotal connection, said floating pivotal connection and said pivotal support in substantial alignment with each other, whereby inadvertent pivotal movement of said lever member is prevented during said substantially zero value of said varying quantity.

15. A square root extraction computer, comprising:

a first link member;

a second link member;

floating pivot connection means pivotally interconnecting one end of said first link member directly to one end of said second link member;

fixed pivot means pivotally supporting the other end portion of said first link member;

support pivot means on the other end portion of said second link member, the length between the pivot point of said fixed pivot means and the pivot point of said floating pivot connection means of said first link member being substantially equal to the length between the pivot point of said floating pivot connection means and the pivot point of said support pivot means of said second link member;

carrier means separated from said fixed pivot means and movably supporting said support pivot means for limited reciprocatory movement thereof along a fixed path toward and away from the pivot point of said fixed pivot means, such movement being between a reference position of maximum separation in which said first link member is in a first angular position and in which the pivot point of said floating pivot connection means lies on a straight line intersecting both the pivot point of said fixed pivot means and the pivot point of said support pivot means, and a position of reduced separation in which the pivot point of said floating pivot connection means is displaced laterally from said line, with resultant pivoting of said first link member about said fixed pivot means from said first angular position to a second angular position;

input means to position said support pivot means along said line at a distance from said reference position in accordance with a predetermined function of a given input quantity;

and output means responsive to said pivoting of said first link member, giving an output indication proportional to said resultant pivoting;

said indication thereby bearing substantially a square root functional relation to said function of said input quantity.

References Cited

UNITED STATES PATENTS

| | | | |
|---|---|---|---|
| 2,212,652 | 8/1940 | Spitzglass et al. | 235—61 |
| 2,266,839 | 12/1941 | Ackley | 235—61 X |
| 2,437,178 | 3/1948 | Wharton | 235—61 |
| 2,520,546 | 8/1950 | Hughes | 235—91.1 |
| 2,773,642 | 12/1956 | McGay et al. | 235—61 |

FOREIGN PATENTS 1,271,233  7/1961  France.

RICHARD B. WILKINSON, *Primary Examiner.*

W. F. BAUER, L. R. FRANKLIN, *Assistant Examiners.*